United States Patent Office 3,676,086
Patented July 11, 1972

3,676,086
METAL/CARBIDE-OXIDE COMPOSITE
Dong M. Chay and Ralph K. Iler, Wilmington, Del., assignors to E. I. du Pont de Nemours and Company, Wilmington, Del.
Original application Nov. 25, 1968, Ser. No. 784,999, now Patent No. 3,567,408, dated Mar. 2, 1971. Divided and this application Dec. 8, 1970, Ser. No. 96,292
Int. Cl. B32b *15/00*
U.S. Cl. 29—195
12 Claims

ABSTRACT OF THE DISCLOSURE

Disclosed are composite structures comprising (1) a dense, metal-bonded refractory carbide-oxide element metallurgically bonded with a copper-alloy to (2) a dense, cobalt-bonded tungsten carbide element having a substantially uniform coefficient of thermal expansion of from 0.5 to 1.5 times that of said carbide-oxide element. The composites are particularly useful as cutting edges for milling and turning cast iron and hardened steels.

CROSS-REFERENCE TO RELATED APPLICATION

Figure 1:
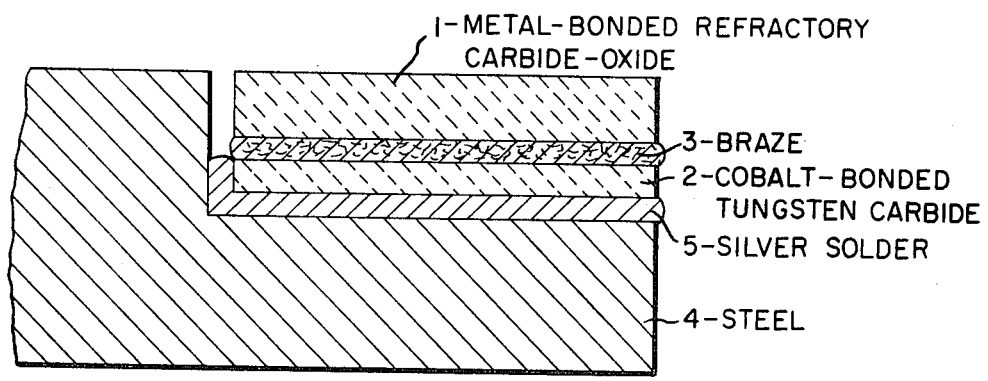

This application is a division of application Ser. No. 784,999, filed Nov. 25, 1968, now Pat. 3,567,408.

DESCRIPTION OF THE INVENTION

General

The metallurgical bond connecting the carbide-oxide and the metal to the cobalt-bonded tungsten carbide comprises a copper-alloy with a highly reactive metal such as titanium, zirconium, or hafnium.

This invention is directed to a composite structure comprising (1) a dense, metal-bonded refractory carbide-oxide element, (2) a metal supporting element and (3) a dense, cobalt-bonded tungsten carbide element metallurgically bonded between the carbide-oxide element and the supporting element, the tungsten carbide element having a substantially uniform coefficient of thermal expansion of from about 0.5 to about 1.5 times that of the carbide-oxide body.

This invention is further directed to a method of securing a dense, metal-bonded refractory carbide-oxide element to a metal support comprising metallurgically bonding the carbide-oxide element with a copper alloy to a dense, cobalt-bonded tungsten carbide base having a substantially uniform coefficient of thermal expansion of from about 0.5 to about 1.5 times that of said carbide-oxide element and thereafter metallurgically bonding the tungsten carbide base to the metal support.

The composite structures are useful tools for milling and turning cast iron and hardened steels, and as equipment parts with wear resistant, corrosion resistant, and temperature resistant facings.

It is difficult to join the dense carbide-oxides and metal supports, such as steel tool shanks, for two reasons.

First, the surface of carbide-oxide tends to be oxidized during the process of brazing in air. If the carbide portion of the surface does become oxidized, the surface is difficult to wet with conventional brazes and solders.

The second, and more troublesome, problem encountered when attempting to bond the dense carbide-oxide composites directly to metals such as steel is caused by the difference between the coefficients of thermal expansion of the two materials. The metal contracts much more than the dense carbide-oxide composite as the two cool after being metallurgically bonded, causing the laminate to bend with the outer surface of the carbide-oxide being subjected to such a strain that it cracks. In an attempt to overcome the thermal mismatch problem, shims of copper and bronze have been used between the dense carbide-oxide and metal; but much of the strain is still transmitted to the dense carbide-oxide.

One technique which has been suggested for securing materials of markedly different expansion coefficients involves the use of a connecting element commonly referred to as a "graded seal." This type of connecting element has an expansion coefficient which varies along its length in a stepwise or continuous manner and at each end matches that of the material to which it is bonded. In Zimmer, U.S. Pat. No. 3,284,174 and in Zimmer, "New Ways to Bond Dissimilar Materials," Material Progress (TM), January 1963, the use of graded seals produced by powder metallurgy is discussed in detail.

While the use of graded seals usually makes it possible to obtain very secure bonds between dissimilar materials, it also has some unattractive aspects. For example, the production of graded seals is ordinarily very tedious and costly, and the seals often require more space than is available in many applications for dense carbide-oxides. Also, the expansion coefficients of both of the materials to be joined must be known before the seals can be produced.

It has been found that metal-bonded refractory carbide-oxide composites can be secured to a metal such as steel without using connecting elements of continuously varying compositions. More particularly, it has been discovered that this can be accomplished by using a dense, cobalt-bonded tungsten carbide connecting element having a high cobalt content and thus a substantially uniform expansion coefficient approximating that of the carbide-oxide.

For simplicity, the dense, metal-bonded refractory carbide-oxide composites used in the methods and structures of this invention are hereinafter referred to merely as "carbide-oxide elements" or as "carbide-oxide cutting edges"; likewise, the dense, cobalt-bonded tungsten carbide composites are referred to as "tungsten carbide bases." Composite structures in which a carbide-oxide element is metallurgically bonded to a tungsten carbide base are termed "laminates." The metallurgical bond of the copper alloy is termed "the bond."

The drawing

FIG. 1 represents a cross-section of a tool for milling and turning hard materials such as alloy steels. A dense metal-bonded refractory carbide-oxide cutting edge 1 is bonded to a slice of dense, tungsten carbide base 2 by means of a layer of braze 3 which is preferably a copper-titanium alloy. The tungsten carbide base, which has an expansion coefficient of from about 0.5 to about 1.5 times that of the cutting edge, is bonded to a steel shank 4 through a low-melting silver solder 5.

Figure 2:
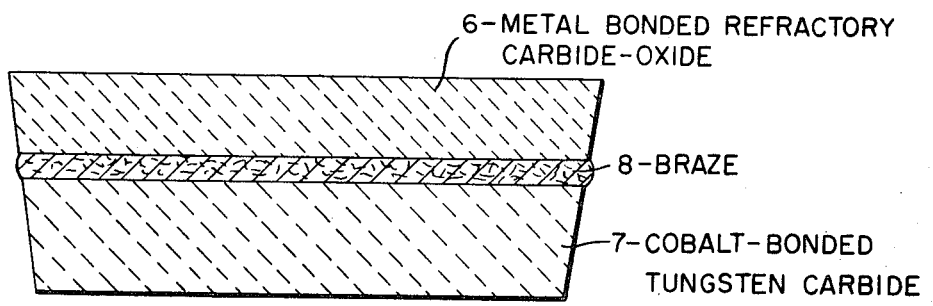

FIG. 2 represents a cross-section of an indexable insert for a cutting tool wherein a carbide-oxide cutting edge 6 is bonded to a tungsten carbide base 7 through preferably a copper-titanium alloy brazing material 8, the base having an expansion coefficient approximating that of the cutting edge. Inserts such as the one in FIG. 2 can be secured to a cutting tool (not shown) by brazing the base to the tool, for example by using a low-melting silver solder and a hand torch.

Carbide-oxide elements

The refractory carbide-oxide which comprises the carbide-oxide elements used in the methods and structures of this invention are those described in copending application Ser. No. 737,223, filed June 14, 1968 by Bergna et al. entitled "Metal Bonded Alumina-Carbide Compositions," the disclosure of which is incorporated herein by reference. That application discloses carbide-oxide dense compositions having an average grain size smaller than 10 microns and composed of two interpenetrating three-dimensional networks, one network of alumina and the other network of metal and a carbide selected from the group consisting of zirconium carbide, hafnium carbide, titanium carbide and their mixtures, the composition consisting essentially of 20 to 90 volume percent alumina, 5 to 79 volume percent carbide and 1 to 20 volume percent metal, said metal consisting essentially of 5 to 90 weight percent of a metal selected from the group consisting of iron, cobalt, nickel and their mixtures and 10 to 95 weight percent of a metal selected from the group consisting of tungsten, molybdenum and their mixtures, with the limitation that the volume percent of carbide must not be less than that of the metal.

Of the carbide-oxide bodies disclosed in Ser. No. 737,223, those which are preferred for use in the methods and structures of this invention are those compositions having an average grain size smaller than 5 microns and composed of two interpenetrating three-dimensional networks, one network of alumina and the other network of metal and titanium carbide, the composition consisting essentially of 40 to 75 volume percent alumina, 12.6 to 58 volume percent titanium carbide, and 2 to 20 volume percent metal, wherein said metal consists essentially of 5 to 90 weight percent nickel and 10 to 95 weight percent molybdenum, with the limitation that the volume percent of carbide must not be less than that of the metal.

Particularly strong bonds are obtained between the carbide-oxide element and tungsten carbide base if the former is an electrical conductor and has a specific resistivity of less than 3000 microhm-centimeters. Ordinarily, carbide-oxide elements containing less than 30 volume percent of electrically conducting phases of carbide and metal will have specific resistivities of greater than 3000 microhm-centimeters, whereas those containing more than 30% of an electrically conducting phases will have specific resistivities of less than 3000 microhm-centimeters. At some value between 20 and 30 volume percent the specific resistivity for a given combination of components changes very markedly as the amount of electrically conducting phase is varied slightly. The exact value at which the specific resistivity changes at a maximum rate depends to a great extent on distribution of the electrically conducting phase. The strongest bonds are obtained with carbide-oxide elements having specific resistivities of less than 500 microhm-centimeters.

Tungsten carbide bases

The bases used in this invention to secure the carbide-oxide elements to steel supports are comprise of cobalt bonded tungsten carbide, i.e., finely divided tungsten carbide bonded with a metallic phase of cobalt. As pointed out above, these bases have substantially uniform expansion coefficients of from about 0.5 to about 1.5 times that of the carbide-oxide. Preferably the expansion coefficient will be from about 0.8 to about 1.0 times that of the carbide-oxide. Thus, if the carbide-oxide element has a coefficient of expansion of $8 \times 10^{-6}/°$ C., the base will preferably have a coefficient of expansion of at least less about $6.4 \times 10^{-6}/°$ C.

The expansion coefficient of cobalt-bonded tungsten carbide is primarily dependent on its cobalt concentration. According to Russian Metallurgy and Mining Journal 1964, No. 1, pages 113 to 121, cobalt-bonded tungsten carbides containing 6%, 10% and 12% by weight of cobalt has coefficients of thermal expansion of $5.0 \times 10^{-6}$, $5.3 \times 10^{-6}$ and $6.3 \times 10^{-6}$ per degree centigrade, respectively. If 25% cobalt is present, the coefficient is $6.4 \times 10^{-6}/°$ C. or higher. Since dense, metal-bonded refractory carbide-oxides ordinarily have expansion coefficients ranging from $6 \times 10^{-6}$ to $8.5 \times 10^{-6}$ per degree centigrade, cobalt-bonded tungsten carbide compositions containing more than 12% cobalt with suitably matching expansion coefficients can be produced.

Tungsten carbide bases having densities of at least 99% of theoretical are generally preferred for use in this invention because of their high strength and stiffness.

Metallurgical bonding

A variety of metallurgical bonding techniques can be used to produce the structures of this invention, but care must be taken to avoid oxidation of the freshly cut surface of the carbide-oxide body. The metallurgical bond can be formed for example by hot pressing the elements to one another, but brazing techniques are preferred.

Brazing metals suitable for bonding are strong, ductile metals having melting points higher than about 1000° C., e.g., copper. Although copper alone often will not bond well to the carbide-oxide material, a copper alloy containing less than 50% titanium, zirconium, or hafnium is very efficient.

In one preferred method of forming the metallurgical bond a freshly cut carbide-oxide element is sand-blasted to remove all traces of dust or grease. A sheet of titanium foil about 0.002 inch. in thickness is placed on this surface and over this is placed a cleaned, pure copper foil from 0.005 to 0.015 inch thick after which the tungsten-carbide base is placed against the copper. The resulting sandwich is bound together tightly with Nichrome or pure iron wire. This assembly is then positioned in a high vacuum furnace so that the foils are situated horizontally and is heated to about 1500° C. for 5 minutes under a vacuum at a pressure of less than $10^{-4}$ torr. The heating need only be long enough to establish good wetting of the surfaces by the resulting liquid copper alloy. The assembly is allowed to cool to about 200° C. in less than about ten minutes and is removed from the furnace. The carbide side of the resulting laminate is cleaned by sand-blasting and is brazed to a metal support using a conventional low-melting silver solder.

While a copper-titanium alloy made from metal foils or sheets as described above is one of the preferred brazing materials for joining the carbide-oxide element to the tungsten carbide base, it is also possible to use preformed high-copper alloys of copper containing titanium, zirconium, or hafnium to improve the bonding to the carbide-oxide.

Brazing of the carbide-oxide element and tungsten carbide base is carried out in the absence of reactive gases such as oxygen or nitrogen. An argon or helium atmosphere may be used but a high vacuum is preferred.

For joining the tungsten carbide bases to steel, low-melting silver-containing solders ordinarily used to secure cobalt-bonded tungsten carbide cutting edges to steel can be employed. A preferred solder for this purpose is a silver solder designated B-Ag$_3$, ASTM Classification, which has a solidus temperature of 1170° F and consists of 50% silver, 15.5% copper, 15.5 zinc, 16% cadmium and 3% nickel.

Cutting tools of this invention, utilizing the carbide-oxide element as the cutting edge, include reamers, grooving tool, milling blades, form tools, gun drills, and turning tools used on tracer lathes. The high wear resistance of the cutting edge and the strength and toughness of the cobalt-bonded carbide base provide long-lasting tools of particular value in automatically controlled metal-shaping machines.

The following examples are illustrative of the subject matter of this invention.

EXAMPLE 1

Carbide-oxide composition

The carbide-oxide composition contains 50% by volume aluminum oxide, 45% by volume of titanium carbide, and 2½% by volume each of nickel and molybdenum and has been hot pressed at 1800° C. for 7 minutes at 4,000 p.s.i. The carbide-oxide has the following properties:

Expansion coefficient: $8 \times 10^{-6}/°$ C.,
Specific resistivity: 400 microhm-centimeters,
Density: 99+% of theoretical, and
Dimensions: 1 inch x 1 inch x ¹⁄₁₆ inch.

Tungsten carbide composition

Composition: 75% by weight of tungsten carbide and 25% by weight of cobalt,
Expansion coefficient: $7 \times 10^{-6}/°C$,
Density: 99+% of theoretical, and
Dimensions: 1 inch x 1 inch x 3/16 inch.

The carbide-oxide and tungsten carbide slices are each ground flat on one side to a surface finish of 100 microinches and are then cleaned and given a matte finish by sand-blasting. A sheet of titanium foil 0.002 inch thick and a sheet of copper foil 0.010 inch thick is placed between the surfaces, the titanium being next to the carbide-oxide. The assembly is then tied together tightly with a No. 24 Nichrome wire and is heated to 1200° C. in ten minutes under a vacuum of $10^{-4}$ torr. This temperature is maintained for five minutes and the assembly is then cooled to less than 600° C. within 15 minutes and then further to 200° C. before removing the laminate from the vacuum.

The carbide side of the laminate is then brazed to a steel cutting tool shank in a conventional manner with silver solder having a melting point below 900° C. The tool is then diamond ground and used for turning hardened AISI 4340 alloy steel having a hardness on the Rockwell C scale of 55, at 800 surface feet per minute, a feed of 0.010 inch per revolution and a depth of 0.050 inch.

EXAMPLE 2

Three laminates 1 1/16 inches by 1 1/16 inches square and 1/4 inch thick are produced as described in Example 1. Each laminate is diamond sawed into four equal square pieces which are finished ground to form rectangular cutting inserts (0.500 by 0.500 by 3/16 inch) having a radium of 1/32 inch ground on each corner. The twelve inserts so produced are brazed in a negative rake milling head which is then used to face mill gray cast iron castings at 1200 surface feet per minute, 0.010 inch feed per tooth, 0.050 inch depth and two inches width of cut. A total cut of 1000 feet in length is made before the inserts fail and need to be reground.

We claim:

1. A composite structure comprising (1) a dense, metal-bonded refractory carbide-oxide elment, (2) a metal supporting element, and (3) a dense, cobalt-bonded tungsten carbide element metallurgically bonded between the carbide-oxide element and the metal supporting element, the tungsten carbide element having a substantially uniform coefficient of thermal expansion of from about 0.5 to about 1.5 times that of said carbide-oxide element.

2. The composite structure of claim 1 wherein said tungsten carbide element has a substantially uniform expansion coefficient of from about 0.8 to about 1.0 times that of said carbide-oxide element.

3. The composite structure of claim 1, wherein said carbide-oxide element has a specific resistivity of less than 3000 microhm-centimeters.

4. The composite of claim 3 wherein said carbide-oxide element has a specific resistivity of less than 500 microhm-centimeters.

5. A composite structure comprising (1) a metal-bonded refractory carbide-oxide element consisting essentially of a dense composition having an average grain size smaller than 10 microns and composed of two interpenetrating three-dimensional networks, one network of alumina and the other network of metal and a carbide selected from the group consisting of zirconium carbide, hafnium carbide, titanium carbide, and their mixtures, said composition consisting essentially of 20 to 90 volume percent alumina, 5 to 79 volume percent carbide, and 1 to 20 volume percent of a metal, said metal consisting essentially of 5 to 90 weight percent of a metal selected from the group consisting of iron, cobalt, nickel, and their mixtures, and 10 to 95 weight percent of a metal selected from the group consisting of tungsten, molybdenum, and their mixtures, with the limitation that the volume percent of carbide must not be less than that of the metal; (2) a steel supporting element; and (3) a cobalt-bonded tungsten carbide element having a density of at least 98% of theoretical and a substantially uniform coefficient of thermal expansion of from about 0.5 to about 1.5 times that of said carbide-oxide element; the tungsten carbide element being metallurgically bonded between the carbide-oxide element and the metal supporting element, and the metallurgical bond between the carbide-oxide element and the tungsten carbide element being a copper-rich alloy with a material selected from the group consisting of titanium, zirconium, and hafnium.

6. The composite structure of claim 5 wherein said carbide-oxide element is in the form of a cutting edge.

7. The composite structure of claim 5 in which the alumina is present in said carbide-oxide element in an amount ranging from 40 to 75 volume percent.

8. The composite structure of claim 5 in which said carbide-oxide element consists essentially of 40 to 75 volume percent of alumina, 12.6 to 58 volume percent of carbide, and 2 to 20 volume percent of metal.

9. The composite structure of claim 8 in which said carbide-oxide element consists essentially of about 50 volume percent alumina, about 45 volume percent titanium carbide, about 2.5 volume percent nickel, and about 2.5 volume percent molybdenum.

10. The composite structure of claim 5 wherein the carbide of said carbide-oxide element is titanium carbide.

11. The composite structure of claim 5 wherein the metal of said carbide-oxide consists essentially of nickel and molybdenum.

12. The composite structure of claim 5 wherein said carbide-oxide element has an average grain size smaller than 5 microns.

References Cited

UNITED STATES PATENTS

| | | | |
|---|---|---|---|
| 2,836,885 | 6/1958 | Macdonald et al. | 29—472.9 |
| 2,963,782 | 12/1960 | Donnelly | 29—195 X |
| 3,139,329 | 6/1964 | Zeller | 29—195 |
| 3,552,939 | 1/1971 | Darnell et al. | 29—195 |

L. DEWAYNE RUTLEDGE, Primary Examiner

E. L. WEISE, Assistant Examiner